United States Patent
Mohanavelu et al.

(10) Patent No.: US 7,412,221 B2
(45) Date of Patent: Aug. 12, 2008

(54) CROSSTALK REDUCTION METHOD, APPARATUS, AND SYSTEM

(75) Inventors: Ravindran Mohanavelu, Folsom, CA (US); Aaron K. Martin, El Dorado Hills, CA (US); William Dawson Kesling, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 11/092,241

(22) Filed: Mar. 29, 2005

(65) Prior Publication Data

US 2006/0223480 A1    Oct. 5, 2006

(51) Int. Cl.
  *H04B 1/10* (2006.01)
  *H04M 1/76* (2006.01)
  *H03K 17/16* (2006.01)
(52) U.S. Cl. .................. 455/295; 455/296; 455/310; 379/417; 326/26
(58) Field of Classification Search ................. 455/295, 455/296, 310; 379/417; 326/21, 26, 30
See application file for complete search history.

(56) References Cited

U.S. PATENT DOCUMENTS

| | | | | |
|---|---|---|---|---|
| 5,196,733 A | * | 3/1993 | Shin | 327/379 |
| 5,254,883 A | * | 10/1993 | Horowitz et al. | 326/30 |
| 5,596,506 A | * | 1/1997 | Petschauer et al. | 716/5 |
| 6,008,705 A | * | 12/1999 | Ghoshal | 333/1 |
| 6,204,683 B1 | * | 3/2001 | Falconer | 326/30 |
| 6,657,460 B2 | * | 12/2003 | Tang | 326/86 |
| 7,072,415 B2 | * | 7/2006 | Zerbe et al. | 375/286 |
| 2003/0115563 A1 | * | 6/2003 | Chen | 716/5 |
| 2005/0030884 A1 | * | 2/2005 | Kim et al. | 370/201 |
| 2005/0095994 A1 | * | 5/2005 | Schrodinger et al. | 455/78 |

OTHER PUBLICATIONS

Hsieh et al, "Simultaneous Bidirectional PAM-6 Wired Link with Adaptive Pre-emphasis and Trellis Coding", IEEE Conference on Circuit and System, Dec. 2004.*
Pelard, Cattalen, et al., "Realization of Multigigabit Channel Equalization and Crosstalk Cancellation Integrated Circuits", *IEEE Journal of Solid-State Circuits*, vol. 39, No. 10, (Oct. 2004), pp. 1659-1670.
Zerbe, Jared L., "A 2Gb/s/pin 4-PAM Parallel Bus Interface with Transmit Crosstalk Cancellation, Equalization, and Integrating Receivers", *2001 IEEE International Solid-State Circuits Conference*, (2001),3 Pages.

* cited by examiner

*Primary Examiner*—Duc M Nguyen
(74) *Attorney, Agent, or Firm*—Dana B. Lemoine; Lemoine Patent Services, PLLC

(57) ABSTRACT

A data driver drives a data signal on a channel, and a current mode driver drives a varying current on the channel to reduce crosstalk.

12 Claims, 8 Drawing Sheets

CROSSTALK REDUCTION METHOD, APPARATUS, AND SYSTEM

FIELD

The present invention relates generally to interconnect circuits, and more specifically to interconnect circuits with reduced crosstalk.

BACKGROUND

Signal interconnects in electronic systems are commonly subjected to signal crosstalk. Signal crosstalk, or "crosstalk," is caused when a signal on one channel or conductor couples signal energy to another channel or conductor. In the past, attempts to reduce crosstalk have included modifying the characteristics of channels and conductors through mechanical layout techniques and materials modification. Layout techniques include adding guard traces and increasing distances between conductors. Materials modifications include using different materials in the manufacture of printed circuit boards, integrated circuit packages, and the like.

DESCRIPTION OF EMBODIMENTS

Figure 1:
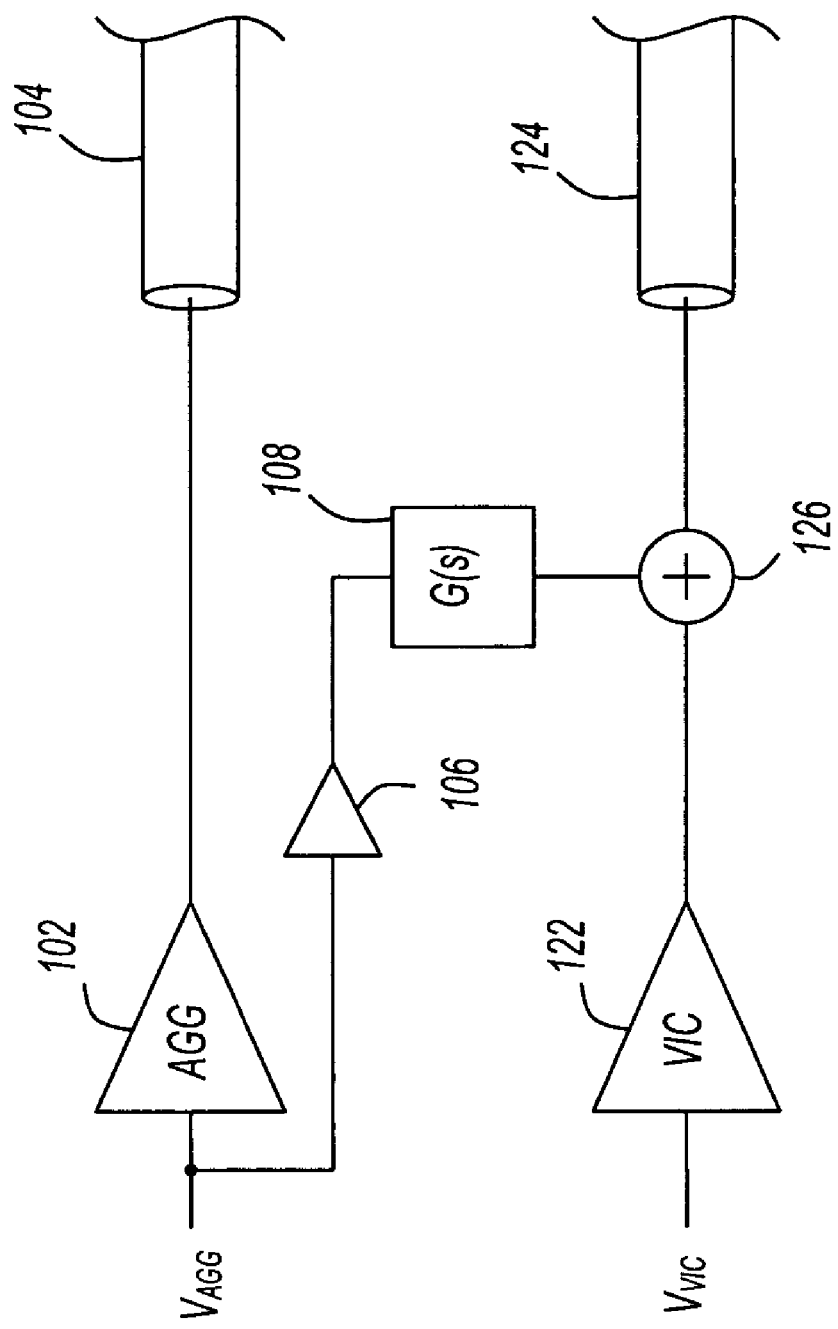
FIG. 1 shows a diagram of two channels with crosstalk reduction.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two channels with crosstalk reduction. Channel 124 is driven by driver 122, and channel 104 is driven by driver 102. When driver 102 drives a signal on channel 104, it may cause interference, or "crosstalk," on channel 124. Crosstalk may be more or less pronounced based on many different factors. For example, if channels 104 and 124 are close together, or are situated parallel to each other for a long distance, crosstalk may be increased. Also for example, if driver 102 produces a signal with high frequency components, or "fast edges," crosstalk may be increased.

In normal operation of a system that includes the channels of FIG. 1, drivers 102 and 122 may drive data onto their respective channels to be received by receiver circuits (not shown). The data signal driven by driver 102 may be considered as an "aggressor" signal because it creates crosstalk on channel 124. Likewise, the data signal driven by driver 122 may be considered as a "victim" signal because it is subjected to the crosstalk. Following this naming convention, driver 122 is referred to herein as a "victim" driver, and driver 102 is referred to as an "aggressor" driver. This naming convention is used in this description solely to differentiate between drivers, signals, and channels that cause crosstalk and are subjected to crosstalk. In practice, any driver, signal, or channel may be labeled an aggressor or a victim without departing from the scope of the present invention. For example, driver 102 may be both an aggressor and a victim. It may be an aggressor that causes crosstalk on channel 124 or any other channel, and it may be a victim subject to crosstalk caused by driver 122 or any other driver.

Driver 106, filter 108, and summer 126 provide a signal path to reduce crosstalk. Driver 106 receives the aggressor signal $V_{AGG}$, and a filtered version is summed with the output of driver 122 to reduce crosstalk on channel 124. In some embodiments of the present invention, summer 126 is a junction where two conductors meet. For example, filter 108 may provide a current mode signal to sum a current with the output of driver 122. In these embodiments, summer 126 may be a circuit node upon which output current from driver 122 sums with output current from filter 108.

In some embodiments, filter 108 provides a current that is related to high frequency components of $V_{AGG}$. For example, if $V_{AGG}$ is a digital signal with a fast edge, filter 108 may provide a pulse of current when the fast edge appears on $V_{AGG}$. The pulse of current may travel through channel 124, and may reduce crosstalk in channel 124 caused by the fast edge on channel 124. Also for example, if $V_{AGG}$ is a continuously varying signal, filter 108 may provide a continuously varying current to reduce crosstalk on channel 124 caused by the continuously varying signal $V_{AGG}$.

FIG. 1 shows two channels, but any number of channels may be included without departing from the scope of the present invention. For example, a port on an integrated circuit may include many drivers to drive channels off-chip. Each of the drivers may be considered an aggressor and/or a victim with respect to one or more of the other drivers.

Figure 2:
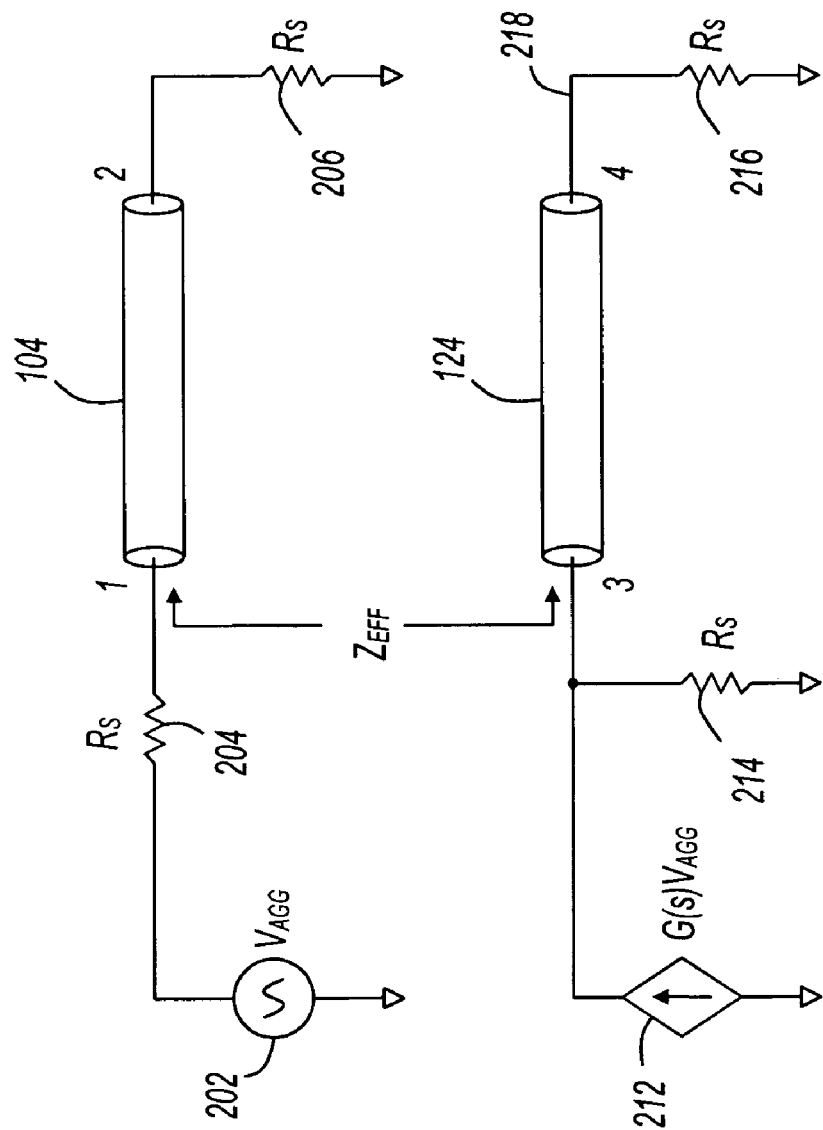
FIG. 2 shows a circuit to model crosstalk reduction.

FIG. 2 shows a circuit to model crosstalk reduction. Channel 104 is shown driven by voltage source 202 with series impedance $R_S$ at 204. Channel 104 is shown terminated by $R_S$ at 206. In a practical application, $R_S$ 206 represents any load presented to channel 104. For example, $R_S$ 206 may represent an impedance presented by a receiver circuit or an impedance presented by a combination of passive termination components and a receiver circuit. Channel 124 is shown driven by current source 212 with parallel impedance $R_S$ at 214. Channel 124 is shown terminated by $R_S$ at 216. In a practical application, $R_S$ 216 represents any load presented to channel 124. For example, $R_S$ 216 may represent an impedance presented by a receiver circuit or an impedance presented by a combination of passive termination components and a receiver circuit. Channel 104 is shown having ports labeled "1" and 2," and channel 124 is shown having ports labeled "3" and "4." These port labels are used below to represent transfer functions between ports.

As shown in FIG. 2, $Z_{EFF}$ represents the impedance looking into port 1 when it is disconnected from $R_S$ 204 and $V_{AGG}$ 202. Further, $Z_{EFF}$ also represents the impedance looking into port 3 when it is disconnected from $R_S$ 214 and dependent current source 212. The analysis presented in the equations below assumes that channels 104 and 124 are identical for simplicity, although the present invention is not limited in this regard.

The crosstalk noise seen at a victim receiver at node 218 is given by:

$$V_{XTALK} = H_{41}(s) * V_{AGG} * [Z_{EFF}/(Z_{EFF}+R_S)] \quad \text{Eq. 1}$$

Introduce a function G(s) such that $$V_{AGG} * G(s) * [Z_{EFF} * R_S/(Z_{EFF}+R_S)] * H_{43}(s) = -V_{XTALK} \quad \text{Eq. 2}$$

and combining Eq. 1 and Eq., 2, $$G(s) * R_S = -(H_{41}(s)/H_{43}(s)) \quad \text{Eq. 3}$$

To derive $H_{41}(s)$ and $H_{43}(s)$ an alternating current (AC) signal can be applied at ports 1 and 3 and the AC magnitude can be measured at port 4.

$$H_{41}(s) = V_{AC}(4)/V_{AC}(1); H_{43}(s) = H_{21}(s) = V_{AC}(2)/V_{AC}(1). \quad \text{Eq. 4}$$

The problem is reduced to applying an AC signal at port 1 and measuring the AC magnitude at ports 2 and 4.

The filter function G(s) can be derived from the transfer function $|G(s)*R_S|=|H_{41}(s)/H_{43}(s)|$ described in the previous paragraphs. Current source 212 produces a current equal to $G(S)V_{AGG}$, which reduces crosstalk noise at node 218 caused by $V_{AGG}$ being driven on channel 104. In some embodiments, G(s) is approximated, in part because the exact channel measurements for a given implementation may not be known prior to implementing the filter 108 (FIG. 1). For example, an integrated circuit may include crosstalk reduction circuits to be used with drivers that drive signals off-chip. The channels driven by the drivers may be circuit board traces or other external conductors, and the characteristics of these channels may not be known at the time the filter is designed.

Figure 3:
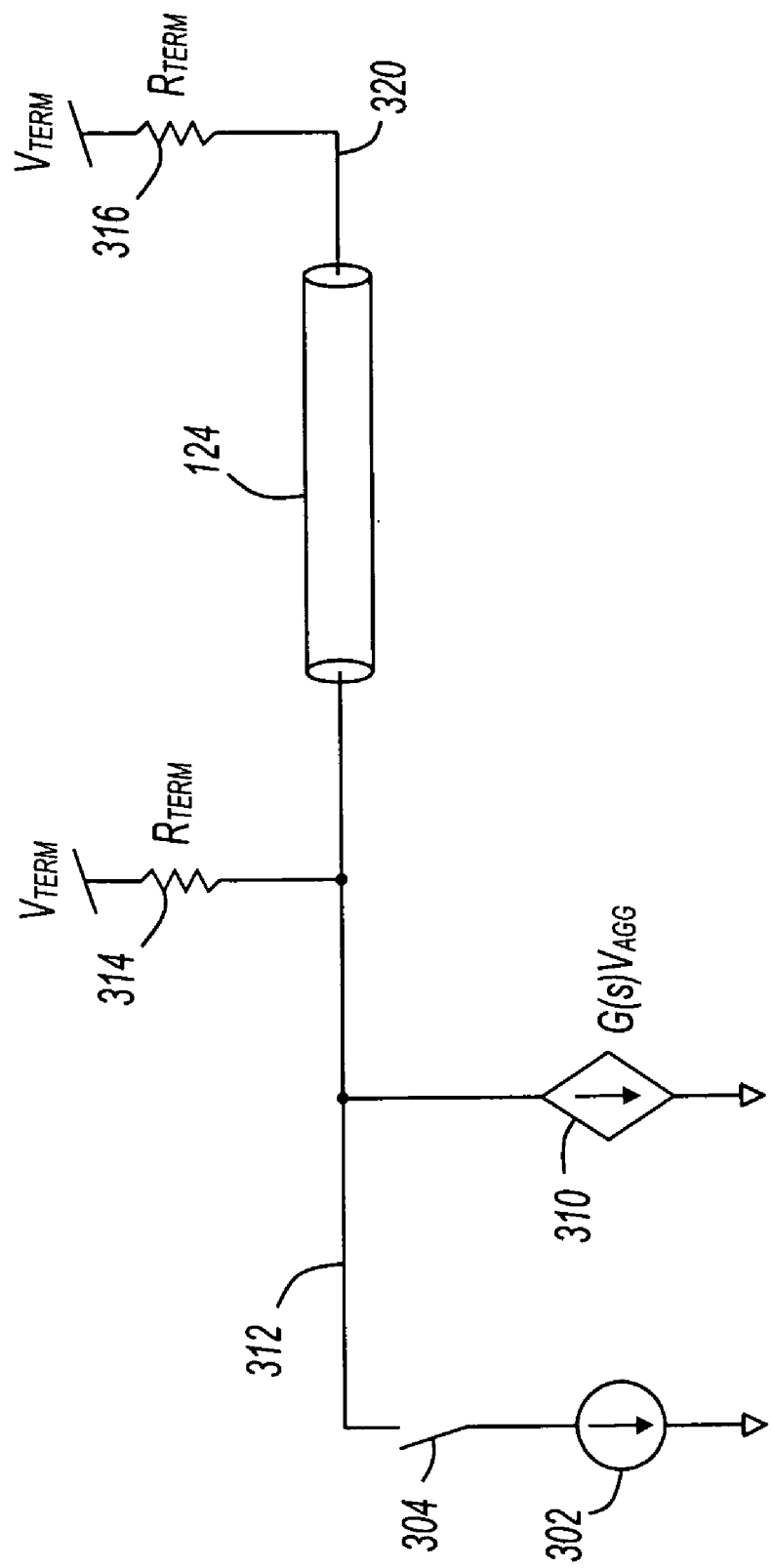
FIGS. 3-5 show current mode drivers with crosstalk reduction.

FIG. 3 shows a current mode driver with crosstalk reduction. The circuit shown in FIG. 3 includes victim channel 124 driven by current mode driver 302. Current mode driver 302 is shown coupled to channel 124 by switch 304 to signify the on/off switching of current to transmit data onto channel 124.

Current source 310 also drives channel 124. Current source 310 is a crosstalk reduction driver that drives a current on channel 124 in response to the aggressor data signal $V_{AGG}$. For example, current source 310 provides a current equal to $G(S)V_{AGG}$ to reduce crosstalk seen at node 320, as described with reference to the previous figures.

In some embodiments, current source 310 sources a current that includes a constant component and a transient component. For example, current source 310 may drive a substantially constant current as well as current pulses on channel 124. In these embodiments, the transient component reduces crosstalk, and is equal to $G(s)V_{AGG}$. Also in these embodiments, the constant component may cause a voltage drop across $R_{TERM}$ 314 and 316, thereby limiting the maximum voltage on node 312.

Node 312 is terminated by $R_{TERM}$ 314 to a voltage $V_{TERM}$. $V_{TERM}$ may be any voltage suitable to terminate $R_{TERM}$. For example, $V_{TERM}$ may be equal to a power supply voltage value used by circuits in drivers 302 and 310, or may be a voltage above or below a power supply value. In some embodiments, $V_{TERM}$ is a voltage above a nominal power supply value that allows the voltage on node 312 to approach the nominal power supply value with a voltage drop across $V_{TERM}$.

Figure 4:
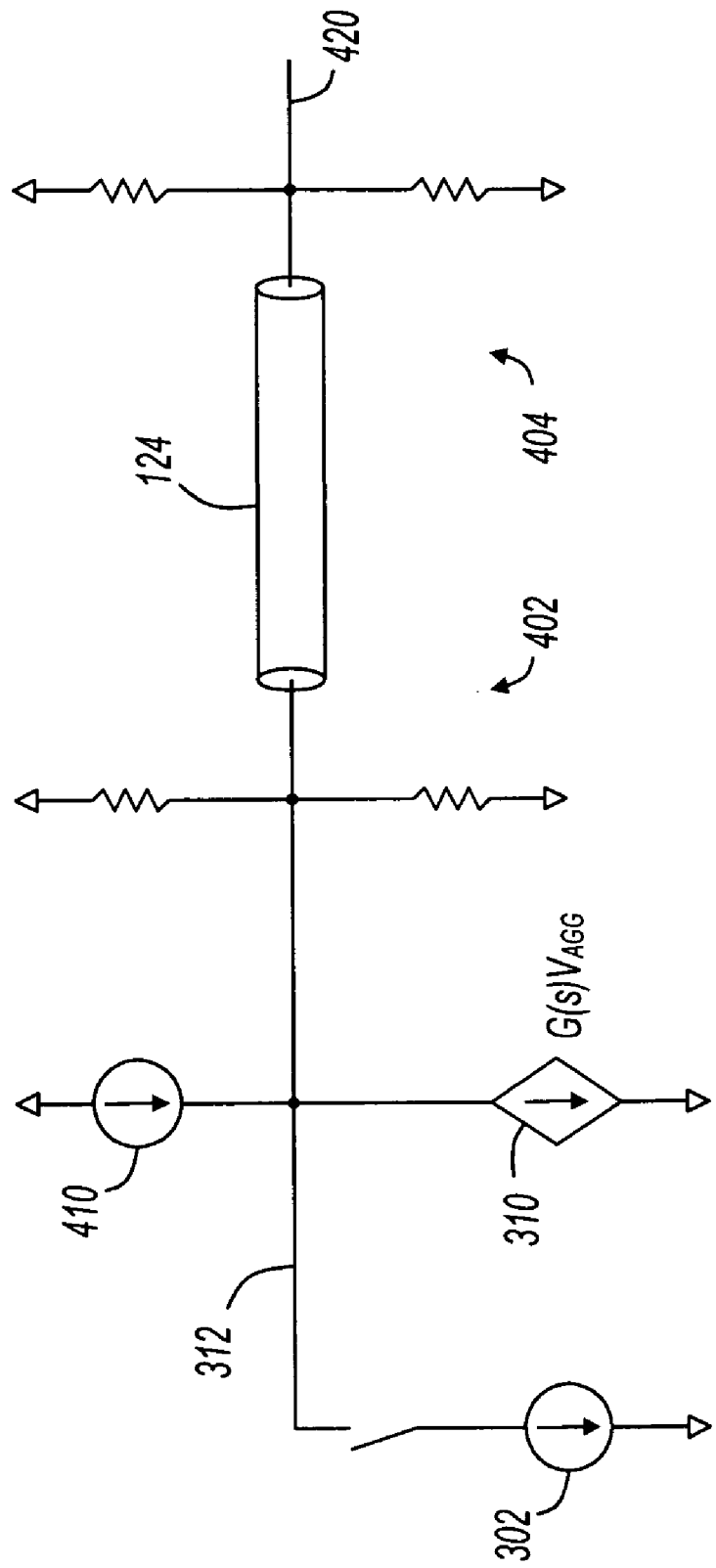

FIG. 4 shows a current mode driver with crosstalk reduction. The circuit shown in FIG. 4 is similar to the circuit of FIG. 3, with the exception of current source 410 and termination networks 402 and 404. In some embodiments, current source 410 sources a current substantially equal to the constant current component provided by current source 310. In these embodiments, the constant current component does not flow through a termination resistor, and does not limit the maximum voltage that can be developed on node 312. Also in these embodiments, the transient current component sourced by current source 310 flows through channel 124 to reduce the crosstalk noise present on node 420.

Termination networks 402 and 404 are shown as parallel termination networks, but this is not a limitation of the present invention. For example, in some embodiments, terminations are provided to an upper power supply value, and in other embodiments, terminations are provided to a lower power supply value. In still further embodiments, series terminations are provided.

Figure 5:
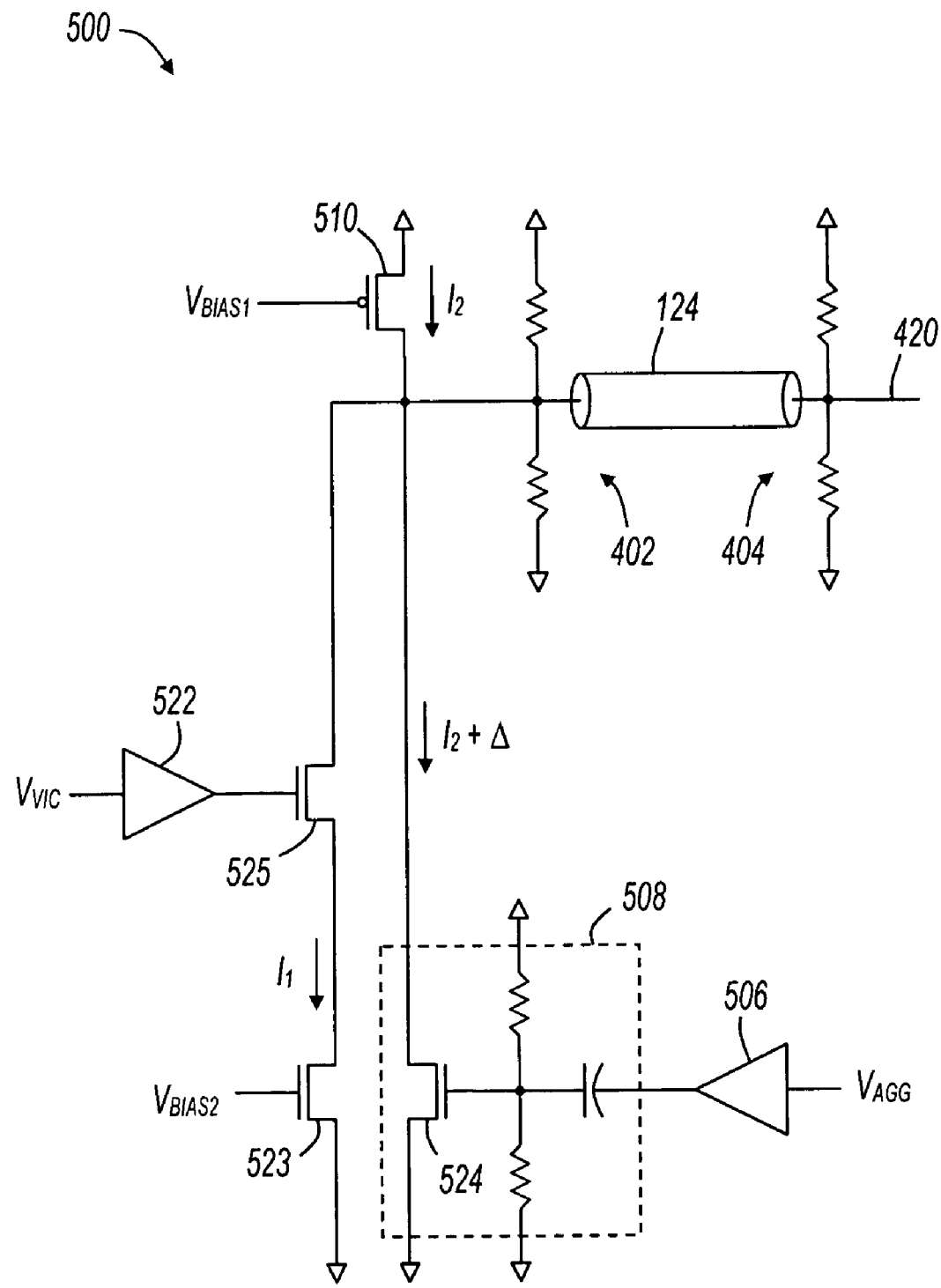

FIG. 5 shows a current mode driver with crosstalk reduction. Circuit 500 includes channel 124, termination networks 402 and 404, transistors 510, 523, 524, and 525, victim driver 522, aggressor driver 506, and filter 508.

In operation, victim driver 522 drives a current mode data signal on channel 124, and the combination of aggressor driver 506, filter 508, and transistor 524 produce a current mode crosstalk reduction signal also driven on channel 124. Victim driver 522 provides a current mode signal by switching transistor 525 on and off. For example, a digital signal may be represented by the presence or absence of $I_1$ on channel 124. As shown in FIG. 5, the current $I_1$ is provided by transistor 523 operating as a current source with a gate bias voltage $V_{BIAS2}$.

The crosstalk reduction signal is produced by varying a current through transistor 524 in response to changes in the aggressor signal $V_{AGG}$. For example, filter 508 is a high pass filter that capacitively couples aggressor driver 506 with transistor 524, and passes signal transients from aggressor driver 506 to the gate of transistor 524. The current through transistor 524 is shown having a substantially constant component $I_2$, and a varying component $\Delta$. $I_2$ is provided by transistor 510 operating as a current source having a gate bias voltage $V_{BIAS1}$. In embodiments represented by FIG. 5, because transistor 510 provides the substantially constant current $I_2$ to transistor 524, $I_2$ does not need to flow through channel 124 or termination networks 402 or 404.

The varying component $\Delta$ of the current flowing through transistor 524 provides crosstalk reduction on channel 124. For example, crosstalk on channel 124 may be caused by $V_{AGG}$ being driven on a separate channel (not shown) adjacent to channel 124. The effects of this crosstalk may be reduced by the varying component $\Delta$ being driven on channel 124. In some embodiments, $\Delta$ includes pulses of current corresponding to fast edges of the digital signal on $V_{AGG}$. In other embodiments, $\Delta$ includes a continuously varying current mode signal corresponding to a continuously varying signal on $V_{AGG}$.

Filter 508 corresponds to filter 108 shown in FIG. 1. Accordingly, filter 508 implements the transfer function G(s). The capacitor in filter 508 capacitively couples the output of driver 506 and the gate of transistor 524. Transistor 524 operates as a transconductance device that converts a voltage to a current. The resistors form a bias network that biases transistor 524 to conduct $I_2$ when in steady-state operation. Values for circuit components within filter 508 may be selected using methods as described above with reference to FIG. 2. Filter 508 is shown having a single capacitor and two resistors, but this is not a limitation of the present intention. For example, any suitable filter topology may be substituted for filter 508 without departing from the scope of the present invention.

The transistors in FIG. 5 and later figures are shown as field effect transistors, and specifically as metal oxide semiconductor field effect transistors (MOSFETs). For example, transistor 510 is shown as a P-type MOSFET, and the remaining transistors are shown as N-type MOSFETs. Other types of switching or amplifying elements may be utilized for the various transistors of circuit 500 without departing from the scope of the present invention. For example, the transistors of circuit 500 may be junction field effect transistors (JFETs), bipolar junction transistors (BJTs), or any device capable of performing as described herein.

Figure 6:
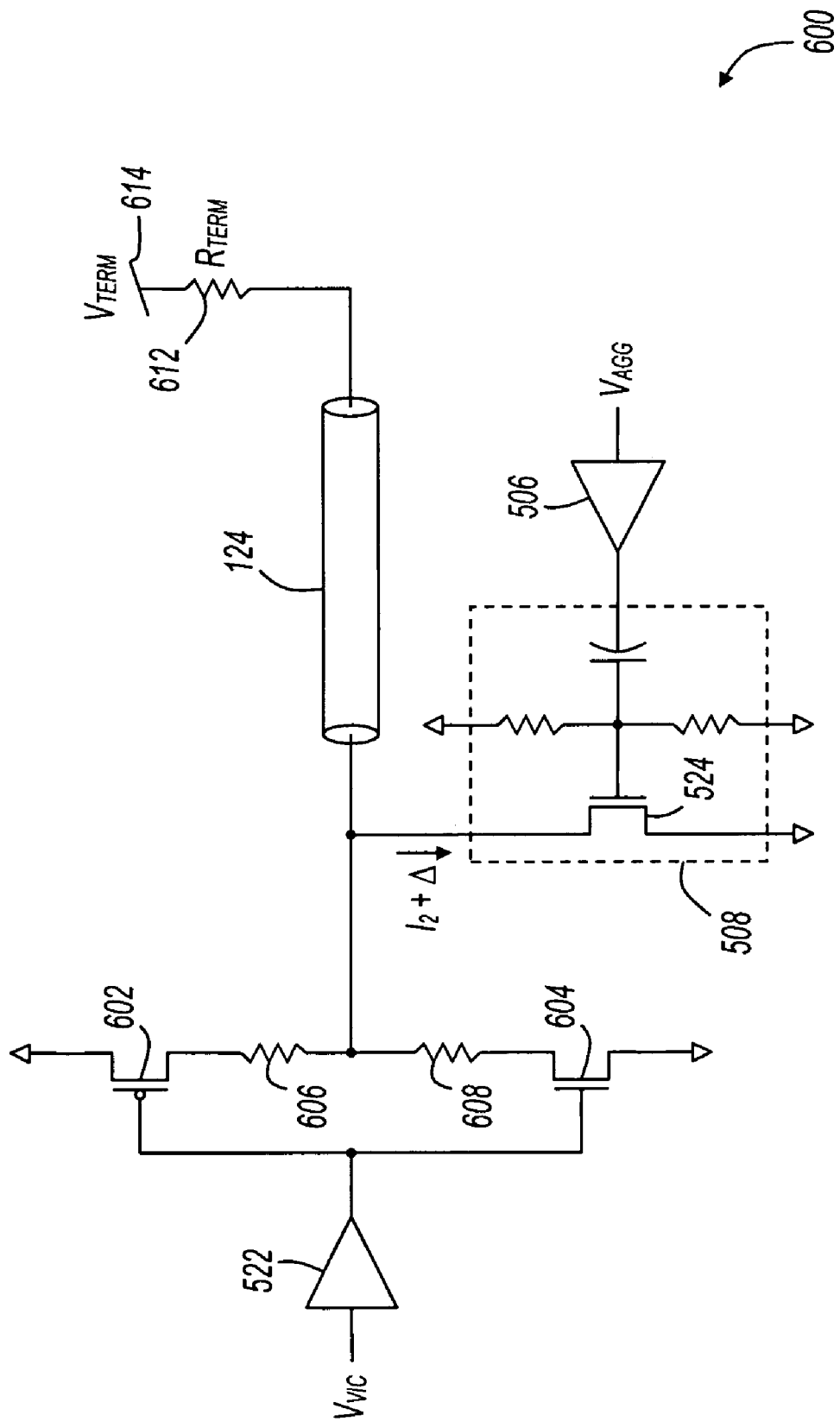
FIG. 6 shows a voltage mode driver with crosstalk reduction.

FIG. 6 shows a voltage mode driver with crosstalk reduction. Circuit 600 includes victim driver 522, aggressor driver 506, filter 508, channel 124, termination $R_{TERM}$ 612, termination voltage $V_{TERM}$ node 614, transistors 602, 604, and 524, and resistors 606 and 608. Transistors 602 and 604 together with resistors 606 and 608 form a voltage mode driver to drive a voltage mode data signal on channel 124 in response to $V_{VIC}$.

In operation, the voltage mode data signal is combined with a crosstalk reduction signal provided by the combination of aggressor driver 506, filter 508, and transistor 524. The operation of aggressor driver 506, filter 508, and transistor 524, is described above with reference to FIG. 5.

As shown in FIG. 6, the current through transistor 524 includes substantially constant component $I_2$, and time varying component $\Delta$. The substantially constant component $I_2$ is provided from node 614, and flows through termination 612 and channel 124. In some embodiments, a current source is included in the circuit to provide $I_2$ to transistor 524, so that $I_2$ need not flow through channel 124. For example, transistor 510 (FIG. 5) may be included in circuit 600.

Figure 7:
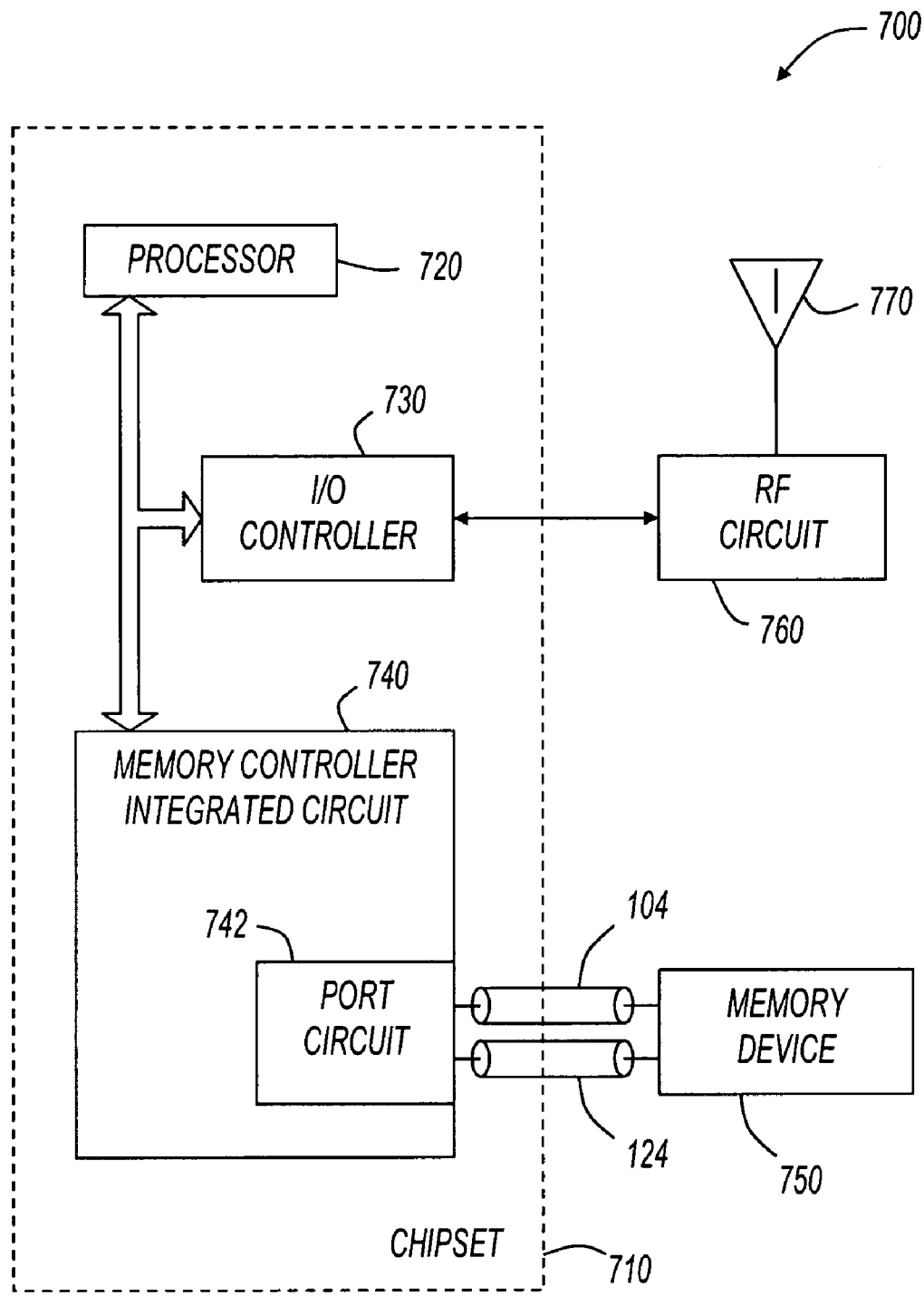
FIG. 7 shows a diagram of an electronic system in accordance with various embodiments of the present invention.

FIG. 7 shows a system diagram in accordance with various embodiments of the present invention. FIG. 7 shows system 700 including chipset 710, radio frequency (RF) circuit 760, antenna 770, memory device 750 and channels 104 and 124. Chipset 710 includes processor 720, input output (I/O) controller 730, and memory controller 740. In operation, system 700 sends and receives signals using antenna 770, and these signals are processed by the various elements shown in FIG. 7. Antenna 770 may be a directional antenna or an omni-directional antenna. As used herein, the term omni-directional antenna refers to any antenna having a substantially uniform pattern in at least one plane. For example, in some embodiments, antenna 770 may be an omni-directional antenna such as a dipole antenna, or a quarter wave antenna. Also for example, in some embodiments, antenna 770 may be a directional antenna such as a parabolic dish antenna, a patch antenna, or a Yagi antenna. In some embodiments, antenna 770 may include multiple physical antennas.

Radio frequency circuit 760 communicates with antenna 770 and I/O controller 730. In some embodiments, RF circuit 760 includes a physical interface (PHY) corresponding to a communications protocol. For example, RF circuit 760 may include modulators, demodulators, mixers, frequency synthesizers, low noise amplifiers, power amplifiers, and the like. In some embodiments, RF circuit 760 may include a heterodyne receiver, and in other embodiments, RF circuit 760 may include a direct conversion receiver. In some embodiments, RF circuit 760 may include multiple receivers. For example, in embodiments with multiple antennas 770, each antenna may be coupled to a corresponding receiver. In operation, RF circuit 760 receives communications signals from antenna 770, and provides analog or digital signals to I/O controller 730. Further, I/O controller 730 may provide signals to RF circuit 760, which operates on the signals and then transmits them to antenna 770.

Memory controller 740 provides an interface between chipset 710 and memory devices such as memory device 750. Memory controller 740 includes port circuit 742 to communicate with memory device 750. For example, port circuit 742 is shown coupled to memory device 750 by channels 104 and 124. Channels 104 and 124, and crosstalk reduction embodiments relating thereto, are described with reference to previous figures. Port circuit 742 may include one or more crosstalk reduction circuits. For example, in some embodiments, a current mode signal is driven on a conductor to reduce the effects of crosstalk on that channel. Port circuit 742 may include any of the crosstalk reduction embodiments described herein.

Chipset 710 may include any number of integrated circuits, or "chips," and may have any level of integration. For example, in some embodiments, chipset 710 includes processor 720 and memory controller 740 in separate packages. Also for example, in some embodiments, chipset 710 may include processor 720 and memory controller 740 on the same integrated circuit die, or on separate integrated circuit die packaged together.

Example systems represented by FIG. 7 include cellular phones, personal digital assistants, wireless local area network interfaces, or any other suitable system. Many other systems uses for crosstalk reduction circuits exist. For example, chipset 710 may be used in a desktop computer, a network bridge or router, or any other system without an antenna.

Figure 8:
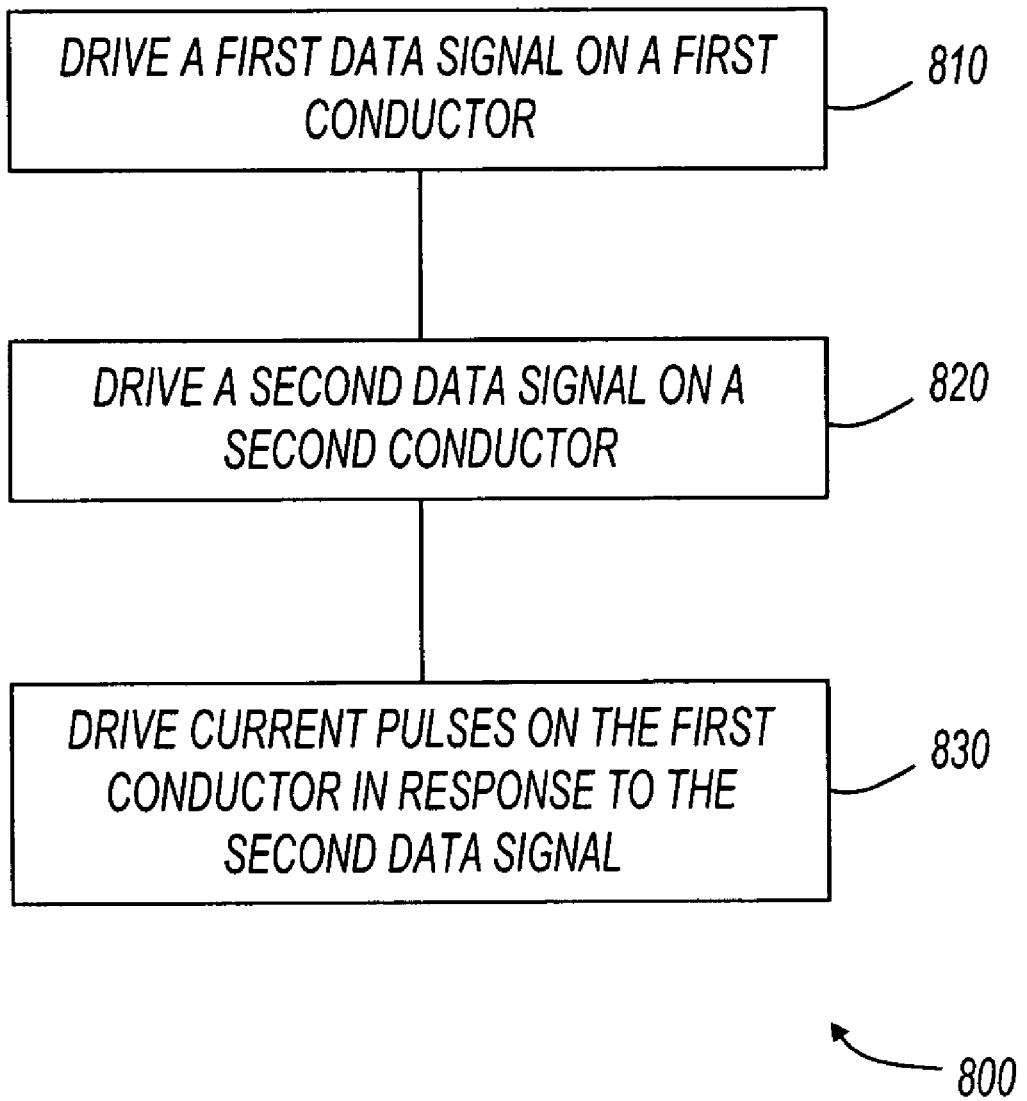
FIG. 8 shows a flowchart in accordance with various embodiments of the present invention.

FIG. 8 shows a flowchart in accordance with various embodiments of the present invention. In some embodiments, method 800 may be used to operate a port circuit with crosstalk reduction. In some embodiments, method 800, or portions thereof, is performed by a port circuit, embodiments of which are shown in the various figures. In other embodiments, method 800 is performed by a memory controller or chipset. Method 800 is not limited by the particular type of apparatus performing the method. The various actions in method 800 may be performed in the order presented, or may be performed in a different order. Further, in some embodiments, some actions listed in FIG. 8 are omitted from method 800.

Method 800 begins at 810 in which a first data signal is driven on a first conductor. In some embodiments, this may correspond to a victim signal being driven on a victim channel as shown in FIG. 1. At 820, a second data signal is driven on a second conductor. In some embodiments, this may correspond to an aggressor signal being driven on an aggressor channel as shown in FIG. 1. At 830, current pulses are driven on the first conductor in response to the second data signal. The current pulses may be driven by a filter circuit, such as filter 108 (FIG. 1), or filter 508 (FIGS. 5, 6).

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A circuit comprising:
   a first data driver coupled to drive a first data signal on a first conductor;

a second data driver coupled to drive a second data signal on a second conductor; and a current mode driver coupled to drive a crosstalk reduction signal on the first conductor in response to the second data signal, wherein the current mode driver includes a transconductance device and a bias network to cause the transconductance device to conduct a substantially constant current, and wherein the current mode driver further includes a voltage driver responsive to the second data signal, the voltage driver being capacitively coupled to the transconductance device.

2. The circuit of claim 1 wherein the first data driver comprises a voltage driver.

3. The circuit of claim 1 wherein the first data driver comprises a current mode driver.

4. An integrated circuit comprising:

a port circuit to communicate with a memory device, the port circuit including a crosstalk reduction driver to drive a first conductor with current pulses to reduce crosstalk from a signal on a second conductor, wherein the crosstalk reduction driver includes a transconductance device and a bias network to cause the transconductance device to conduct a substantially constant current, and wherein the crosstalk reduction driver further includes a voltage driver responsive to the second data signal, the voltage driver being capacitively coupled to the transconductance device.

5. The integrated circuit of claim 4 wherein the port circuit further comprises a first data driver coupled to drive a first data signal on the first conductor, and a second data driver coupled to drive a second data signal on the second conductor.

6. The integrated circuit of claim 5 wherein the first and second data drivers are operatively coupled to drive currents on the conductors to represent the data signals.

7. The integrated circuit of claim 5 wherein the first and second data drivers are operatively coupled to drive voltages on the conductors to represent the data signals.

8. The integrated circuit of claim 4 wherein the integrated circuit comprises a memory controller.

9. The integrated circuit of claim 4 further comprising a current source transistor coupled to source a substantially constant current to the transconductance device.

10. An electronic system comprising:

an antenna;

a radio frequency circuit coupled to the antenna; and a chipset coupled to the radio frequency circuit, wherein the chipset includes a processor and a memory controller, the memory controller having a port circuit to communicate with a memory device, the port circuit including a crosstalk reduction driver to drive a first conductor with current pulses to reduce crosstalk from a signal on a second conductor, wherein the crosstalk reduction driver includes a transconductance device and a bias network to cause the transconductance device to conduct a substantially constant current, and wherein the crosstalk reduction driver further includes a voltage driver responsive to the second data signal, the voltage driver being capacitively coupled to the transconductance device.

11. The electronic system of claim 10 wherein the port circuit further comprises a first data driver coupled to drive a first data signal on the first conductor, and a second data driver coupled to drive a second data signal on the second conductor.

12. The electronic system of claim 11 wherein the first and second data drivers are operatively coupled to drive currents on the conductors to represent the data signals.

* * * * *